US010107934B2

(12) United States Patent
De Vita et al.

(10) Patent No.: US 10,107,934 B2
(45) Date of Patent: Oct. 23, 2018

(54) DEVICE AND METHOD FOR DETECTING NEUTRONS AND GAMMA RAYS

(71) Applicants: ANSALDO NUCLEARE S.P.A., Genoa (IT); INSTITUTO NAZIONALE DI FISICA NUCLEARE, Frascati (IT)

(72) Inventors: Raffaella De Vita, Frascati (IT); Francesca Ambi, Genoa (IT); Gabriele Firpo, Genoa (IT)

(73) Assignees: ANSALDO NUCLEARE S.P.A., Genoa (IT); ISTITUTO NAZIONALE DI FISICA NUCLEARE, Frascati (IT)

( * ) Notice: Subject to any disclaimer, the term of this patent is extended or adjusted under 35 U.S.C. 154(b) by 155 days.

(21) Appl. No.: 15/034,921

(22) PCT Filed: Nov. 7, 2014

(86) PCT No.: PCT/IB2014/065876
§ 371 (c)(1),
(2) Date: May 6, 2016

(87) PCT Pub. No.: WO2015/068133
PCT Pub. Date: May 14, 2015

(65) Prior Publication Data
US 2016/0291196 A1 Oct. 6, 2016

(30) Foreign Application Priority Data
Nov. 8, 2013 (IT) .............................. MI2013A1862

(51) Int. Cl.
*G01T 1/20* (2006.01)
*G01V 5/00* (2006.01)
*G01T 3/06* (2006.01)

(52) U.S. Cl.
CPC .............. *G01V 5/0091* (2013.01); *G01T 1/20* (2013.01); *G01T 3/06* (2013.01)

(58) Field of Classification Search
CPC ............ G01T 1/20; G01T 3/06; G01V 5/0091
(Continued)

(56) References Cited

FOREIGN PATENT DOCUMENTS

GB 2490513 11/2012

OTHER PUBLICATIONS

De Vita R et al: "A large surface neutron and photon detector for civil security applications", Nuclear Instruments & Methods in Physics Research; Section A: Accelerators, Spectrometers, Detectors, and Associated Equipment, Elsevier BV North-Holland, NL, ..vol. 617; No. 1-3,. May 11, 2010; pp. 219-222, XP027050543.
(Continued)

*Primary Examiner* — David Porta
*Assistant Examiner* — Meenakshi Sahu
(74) *Attorney, Agent, or Firm* — Gottlieb, Rackman & Reisman, P.C.

(57) ABSTRACT

A device for detecting neutrons and gamma rays comprises at least one detector and an acquisition and data-analysis system, connected to the detector; the detector comprises an active part that is formed by a plurality of: scintillator layers, made of a scintillator material, in particular a plastic scintillator; and absorber layers, containing at least one neutron-absorbing material, in particular cadmium or gadolinium; the acquisition and data-analysis system is configured so as to: analyze the signals coming from the detector and calculate the total energy released within the detector following upon an interaction with gamma rays or neutrons; and discriminate between gamma rays and neutrons impinging upon the detector according to whether the energy detected is higher or lower than a pre-set threshold.

19 Claims, 4 Drawing Sheets

(58) Field of Classification Search
USPC .......................................................... 250/362
See application file for complete search history.

(56) References Cited

OTHER PUBLICATIONS

Pawe Czak I A et al: "NSTAR—A capture gated plastic neutron detector", Nuclear Instruments & Methods in Physics, Research. Section A: Accelerators, Spectrometers, Detectors, and Associated Equipment, Elsevier BV North-Holland, NL, vol. 629, No. 1, Nov. 17, 2010, pp. 230-238, XP028127878.
De Vita R et al: "A large surface neutron and photon detector for civil security applications", Nuclear Instruments & Methods in Physics Research; Section A: Accelerators, Spectrometers, Detectors, and Associated Equipment, Elsevier BV * North-Holland, NL, ..vol. 617; No. 1-3,. May 11, 2010; pp. 219-222, XP027050543.
Pawe Czak I A et al: "NSTAR—A capture gated plastic neutron detector", Nuclear Instruments & Methods in Physics, Research. Section A: Accelerators, Spectrometers, Detectors, and Associated Equipment, Elsevier BV * North-Holland, NL, vol. 629, No. 1,Nov. 17, 2010, pp. 230-238, XP028127878.
International Search Report and Written Opinion for PCT/IB2014/065876—dated Mar. 6, 2015.

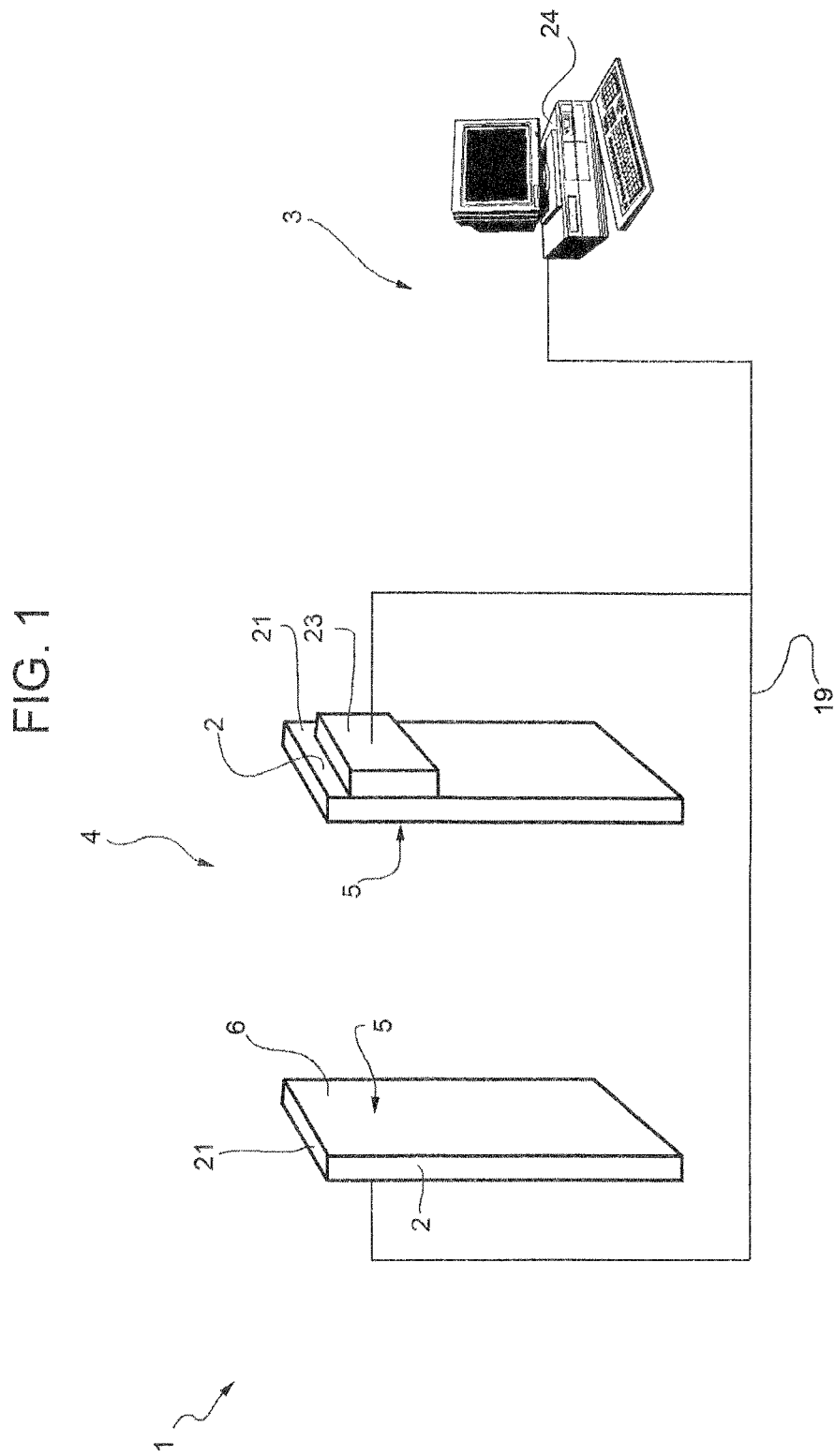

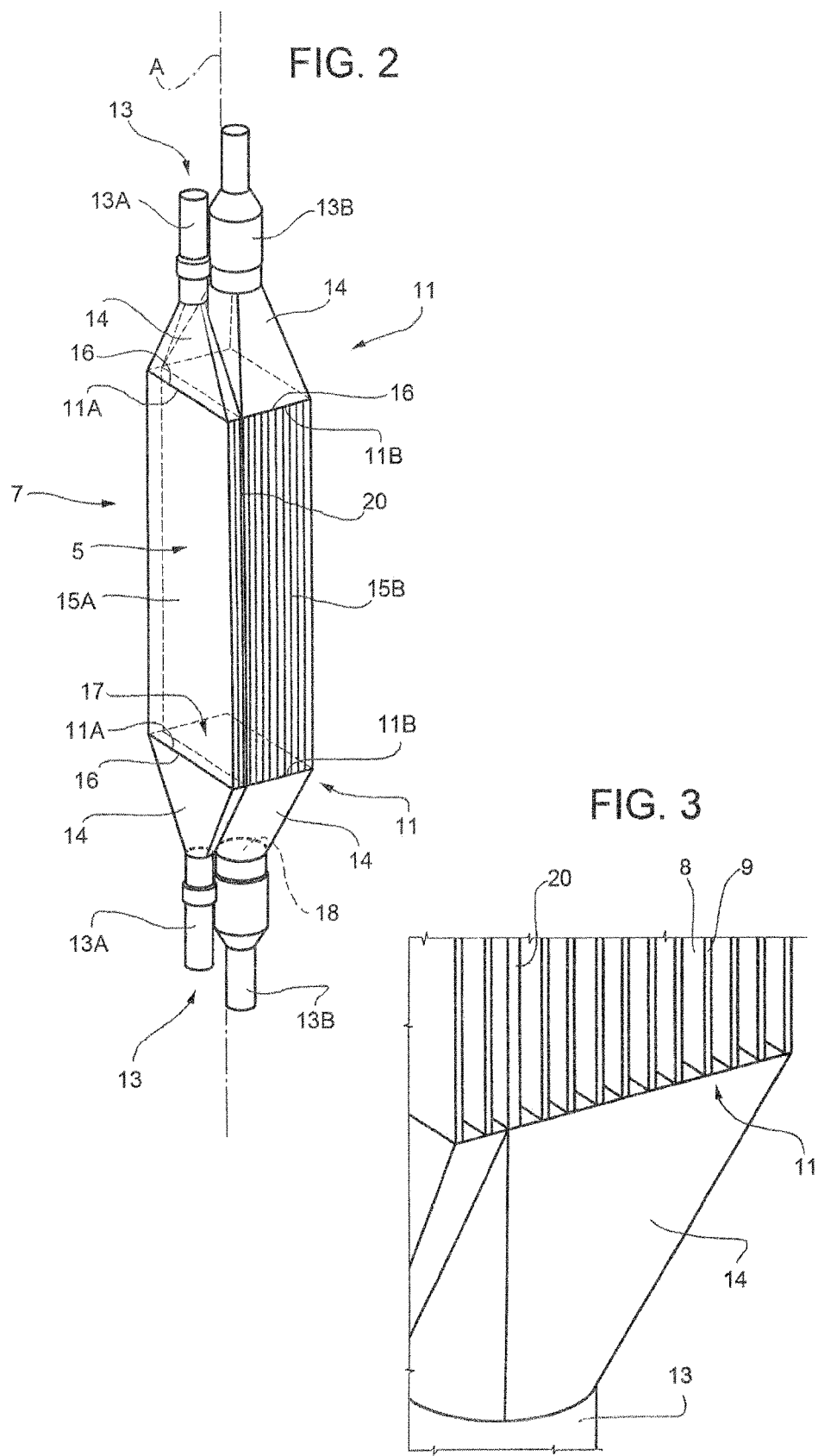

FIG. 4
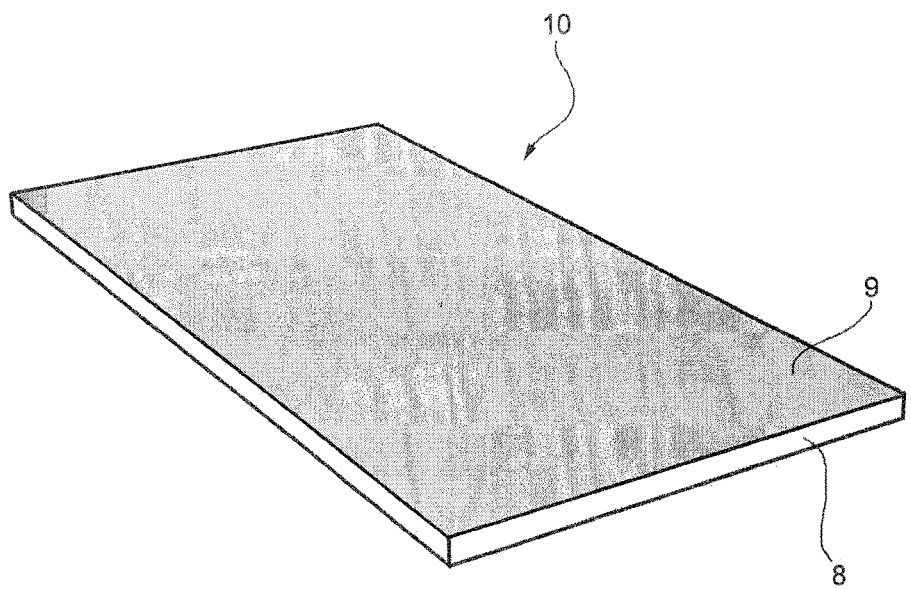
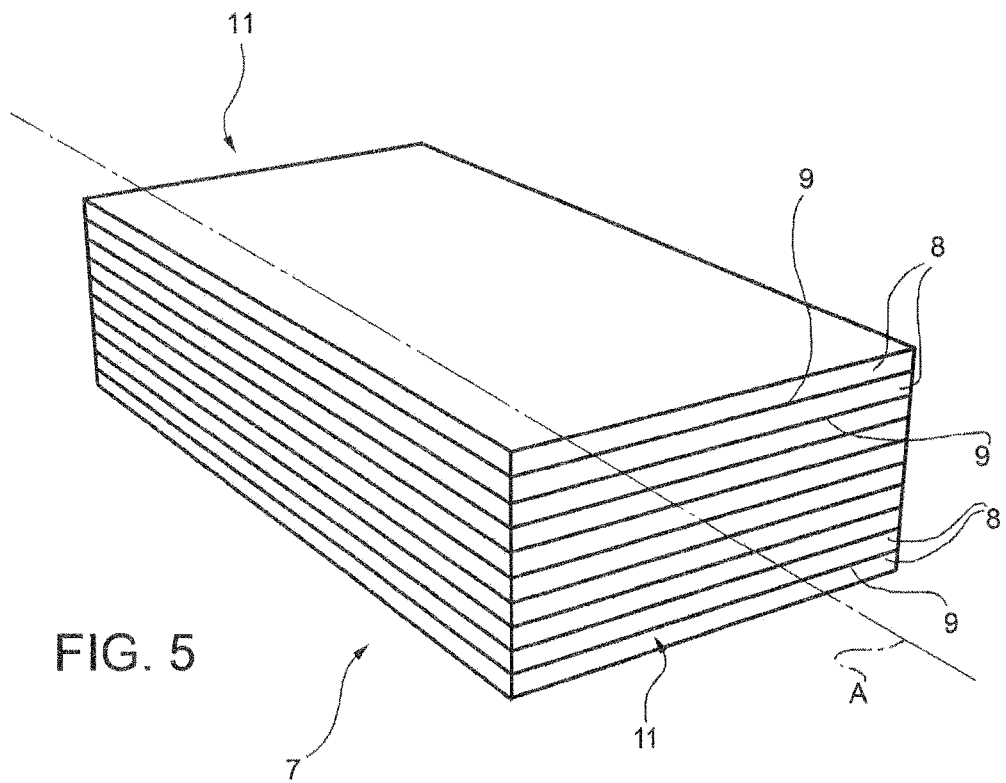
FIG. 5

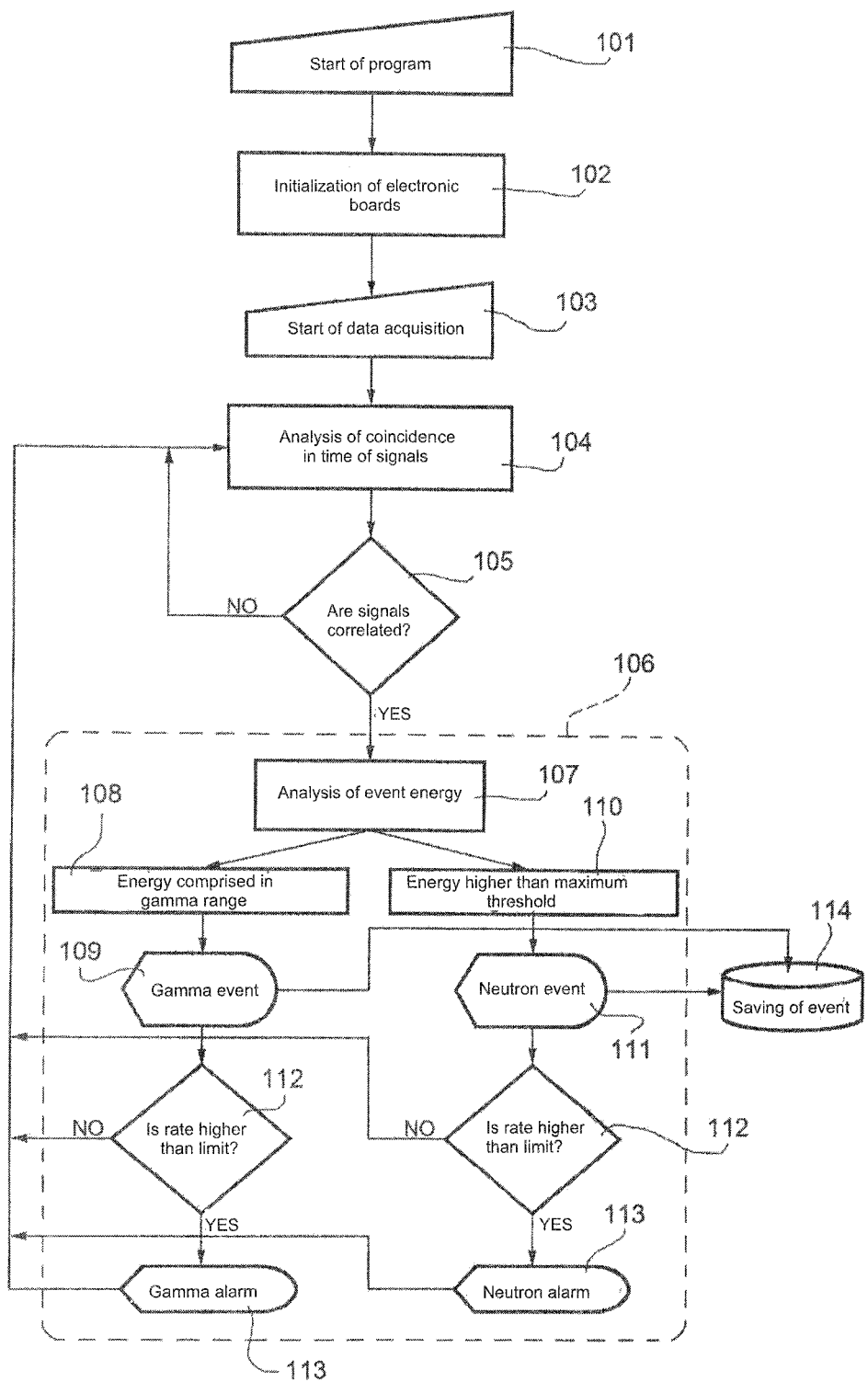

DEVICE AND METHOD FOR DETECTING NEUTRONS AND GAMMA RAYS

This application is the U.S. National Stage application of PCT/IB2014/065876 filed Nov. 7, 2014, which claims priority from Italian Patent Application No. MI2013A001862 filed Nov. 8, 2013.

TECHNICAL FIELD

The present invention relates to a device and a method for detecting neutrons and gamma rays emitted by radionuclides.

The device according to the invention is suited, in particular, to providing a so-called "radiation portal monitor" (RPM), formed by one or more interconnected functional units, designed to detect radionuclides possibly carried by persons and/or vehicles moving along assigned paths.

BACKGROUND ART

There is known the need to install devices for detecting radionuclides, for example, in ports, airports, and stations, and in industrial plants or plants of other kinds that treat radioactive elements or make use thereof or that have the need to carry out monitoring for the presence of radioactive material and prevent introduction of radioactive material.

In particular, above all for security requirements and in response to possible terrorist threats, devices known as "radiation portal monitors" (RPMs), or simply "portals", are increasingly widespread.

These devices must meet international standards, such as, for example, those set down by the following standards:

IEC 62244 (2006): "Radiation protection instrumentation—Installed radiation monitors for the detection of radioactive and special nuclear materials at national borders"; and ANSI N42.35 (2006): "American National Standard for Evaluation and Performance of Radiation Detection Portal Monitors for Use in Homeland Security".

A review of detection devices used in portals may be found in the following technical and scientific papers:

R. Kouzes, et al., "Detecting Illicit Nuclear Materials", American Scientist 93 (2005) 244.

R. Kouzes, et al., "Passive neutron detection for interdiction of nuclear material at borders", Nucl. Instr. and Meth. A583 (2008) 383.

P. E. Fehlau, C. Garcia Jr., R. A. Payne, E. R. Shunk, "Vehicle monitors for domestic perimeter safeguards", Los Alamos National Laboratory, LA-9633-MS UC-15, January 1983.

The majority of the devices currently available for providing portals is typically made up of two distinct active parts: one part is dedicated to detecting gamma radiation, and the other to detecting neutrons.

Gamma radiation is typically detected via devices that use plastic scintillators (for example, polyvinyltoluene) or, in some cases and especially where higher spectrometric performance is required, crystalline scintillators (for example, made of sodium iodide) or semiconductor detectors (for example, made of germanium).

Neutron radiation is instead typically detected via the use of multiple detectors (frequently having a tubular shape) using $^3$He in the gaseous state. The increase in cost of said raw material, due to the reduction of its availability starting from the years 2000, renders, however, necessary research and development of alternative solutions. In fact, $^3$He, which is rare in nature, is mainly generated, artificially, as by-product of the process of production of nuclear warheads. Two concomitant causes have led in the last decades to a reduction in the availability of $^3$He at a global level: on the one hand, the process of disarmament on the part of the main Western Countries starting from the last decades of the last century, and, on the other hand, the simultaneous increase in the demand for new installations of portals at national borders in order to increase security of citizens, following upon the acts of terrorism in the early 2000s. The reduced availability of $^3$He has in turn caused an increase in the cost of the raw material, which represents the current problem of this category of devices.

There hence arises the need to identify materials alternative to $^3$He for neutron detection.

Neutron detectors currently under study for use in portals instead of detectors based upon $^3$He are described in the following paper:

Richard T. Kouzes, James H. Ely, Luke E. Erikson, Warnick J. Kernan, Azaree T. Lintereur, Edward R. Siciliano, Daniel L. Stephens, David C. Stromswold, Renee M. Van Ginhoven, Mitchell L. Woodring: "Neutron detection alternatives to $^3$He for national security applications", Nucl. Instr. Meth., A623 (2010), pp. 1035-1045.

The solutions described in the above paper, as others available today or under development (which, for example, resort to scintillators with lithium and boron trifluoride in the gaseous state, or based upon excimers of noble gases or semiconductors with boron) are not, however, fully satisfactory, above all because in some cases they manifest a lower detection efficiency in regard to $^3$He and, in other cases, because of the toxicity and danger of the materials used.

Other devices under development are described in the international patent application No. WO2013116241-A1. In particular, this document discloses devices for detecting neutrons and gamma rays constituted by two types of different and distinct detectors, one for the neutrons and one for the gamma rays. The two types of detectors use different active elements, such as, for example, two types of different scintillators (for example, a plastic scintillator for gamma rays, and a zinc-sulphide-based composite scintillator for neutrons), or a scintillator and an ionization chamber.

In certain embodiments described in WO2013116241-A1, for detection of neutrons a composite scintillator is used, which contains, in addition to the scintillator element, also Cd or Gd; these elements are used in (solid or liquid) mixture with the scintillator.

In some embodiments, the neutron and gamma-ray detectors are "read" by a common sensor (photomultiplier), and discrimination between neutrons and gamma rays is obtained from analysis of the time plot of the signal.

Also these devices seem to present limits, above all in terms of simplicity of construction and effectiveness and reliability of operation, for example in so far as they require use and management of different active elements, some of which are also relatively complex to produce. Also the system of data analysis for discrimination of gamma rays and neutrons, based upon the time plot of the signal received, may not always prove satisfactory.

A device that is able to detect both neutrons and photons using a single active element for both types of radiation is described in the following paper:

De Vita R., et al., "A large surface neutron and photon detector for civil security applications", Nuclear Instruments and Methods in Physics Research, A617 (2010), pp. 219-222.

The device described therein is based upon a detector formed by an array of plastic scintillator bars wrapped in sheets of a reflecting material containing gadolinium oxide for capturing neutrons. Each bar is coupled to two photomultipliers. This device, both as regards the geometry of the plastic scintillator elements (bars) and owing to the fact that each bar is coupled to two photomultipliers, is not fully satisfactory.

DISCLOSURE OF INVENTION

An aim of the present invention is to provide a device and a method for detecting neutrons and gamma rays that will be free from the drawbacks of the known art highlighted above. In particular, an aim of the invention is to provide a device and a method that will enable detection of both neutrons and gamma rays, in an efficient and at the same time relatively simple and inexpensive way, thus constituting a valid alternative to known solutions.

More in particular, an aim of the invention is to provide a device and a method that will be able to detect simultaneously neutrons and gamma rays, discriminating between the two types of radiation, also operating with traditional materials that present a relatively low cost and are simple to handle (plastic scintillators and neutron absorbers containing gadolinium or cadmium).

The present invention hence regards a device and a method for detecting neutrons and gamma rays, in particular emitted by radionuclides carried by persons and/or vehicles, as defined in basic terms in the annexed Claim 1 and Claim 15, respectively, as well as, for the additional preferred features, in the dependent claims.

The device and the method according to the invention enable detection both of gamma rays and of neutrons, as well as discrimination between gamma sources and neutron sources, using a single active element (that is the same for both), sensitive to gamma rays (in particular a plastic scintillator sensitive to gamma rays), associated to a neutron-absorbing material (for example, cadmium or, preferably, gadolinium) which generates in turn a gamma emission following upon neutron interaction. Gamma rays and neutrons are then discriminated via a purposely provided acquisition and data-analysis system that implements an algorithm of energy-threshold discrimination between gamma events and neutron events (i.e., a discrimination based upon analysis of the energy levels of the events).

The device according to the invention is mainly characterized by an organization into sections of the detector, in which:
the active part of the detector has a layered structure, in which a number of layers of scintillator material alternating with layers of absorber material are grouped together to form at least two active sections; and
each active section is read by a single pair of photomultipliers.

In this way, it is possible to distribute the element that has the function of capturing neutrons, for example gadolinium, within the volume of the scintillator material that constitutes a single section. This characteristic leads to a considerable increase in neutron-detection efficiency as compared to a configuration in which the same amount of absorber material (for example, gadolinium) and scintillator material were used without, however, resorting the peculiar structure of the invention.

Advantageously, but not necessarily, the active sections are asymmetrical, having different thicknesses and/or numbers of layers.

In a preferred embodiment, the detector has two sections configured as follows: a front section (facing, in use, the source to be investigated) of smaller thickness, characterized by a high efficiency of collection of light for measurement of low-energy gamma rays; and a rear section (set behind the front section with respect to the source to be investigated) of greater thickness, for a good containment of the signal produced following upon neutron capture.

The specific structure of the device, and specifically of the active part of the detector that uses a just one active element for detecting both neutrons and gamma rays (scintillator), makes it possible to adopt an energy-threshold discrimination system, which is particularly simple, effective, and reliable.

According to the invention, gamma rays and neutrons are detected, in fact, as follows:
gamma rays are detected directly by the scintillator material;
neutrons slow down in the scintillator material (plastic scintillator) and are then captured by the absorber material (which contains, in particular, gadolinium) with emission of a cascade of gamma rays of overall energy in the region of 8 MeV; this energy release is far higher than that of typical gamma sources.

Gamma rays and neutrons are consequently discriminated by analysing the total energy $E_{TOT}$ detected in the plastic scintillator: events with energy higher than a threshold value $E_{LIM}$, which is appropriately selected, are associated to a neutron emission, whereas events with lower energy are associated to a gamma emission.

Pairs of photomultipliers are optically connected to groups of scintillator layers to detect the light produced following upon interaction of the incident particles.

In order to guarantee a good efficiency of detection of low-energy gamma rays (of the order of tens of kiloelectronvolts), the scintillator layers are grouped and coupled to the photomultipliers in an asymmetrical way, with: just a few scintillator layers, connected to a first pair of photomultipliers, in the front part of the device (facing in use the source being investigated); and a greater number of scintillator layers, connected to a second pair of photomultipliers, in the rear part of the device (furthest away, in use, from the source investigated).

The front part of the device is hence characterized by a high efficiency of collection of the scintillation light, thanks to the higher ratio between the surface of the photomultiplier and the section of the scintillator, and enables detection of low-energy photons. The rear part, characterized by a greater overall thickness of the scintillator, enables absorption with higher efficiency of the cascade of photons emitted by the absorber material (e.g., gadolinium) and hence detection of the neutrons.

The total energy of the individual event is then computed as $E_{TOT}=E_{FRONT}+E_{BACK}$, and the number of events with $E_{TOT}>E_{LIM}$ determines the amount of neutrons detected.

Advantageously, the neutron/gamma-ray discrimination algorithm envisages detecting a signal in the rear active section, i.e., the section furthest away from the radioactive source, for neutron identification. The further request of having $E_{BACK}>0$ enables, together with the condition on the energy threshold, reduction of the measurement noise backgrounds and increase in neutron sensitivity.

The device according to the invention is hence provided just with one active element sensitive to gamma rays (in particular, a plastic scintillator, which is simple to produce and use), and does not include, instead, a specific active element for detecting neutrons, as is the case, for example, of the devices described in WO2013116241-A1.

As compared to the detector described in the paper by De Vita R. et al., "A large surface neutron and photon detector for civil security applications", Nuclear Instruments and Methods in Physics Research, A617 (2010), pp. 219-222, the device according to the invention has a completely different configuration, being formed by plane layers of scintillator material arranged in groups, each group being optically connected to a single pair of photomultipliers (so that each pair of photomultipliers is connected to a plurality of scintillator layers). In this way, the device according the invention achieves a higher efficiency of detection both of gamma rays and of neutrons at low costs (given that there are fewer photomultipliers, fewer signals to handle, and a simpler electronics).

The layers of absorber material (for example, gadolinium) are in solid form in order to enable both a simple construction of the device and a high flexibility of use (in particular, making it possible to provide modular units that can be combined to constitute portals of different sizes and capacity).

In brief, the gamma rays emitted by the radionuclides by spontaneous decay interact in the detector of the device mainly by the Compton effect and by photoelectric absorption, releasing a significant fraction of their energy into the active part of the device. From the spectrum of the signals of the photomultipliers associated to the active part of the device, the spectrum of the incident gamma rays is determined, and, by applying appropriate cuts, the rates of counting of the gamma rays are monitored in various energy windows. The increase of these counting rates with respect to the background level is indicative of the presence of a gamma radioactive source.

Also the neutrons emitted by radionuclides interact with the active part of the device and precisely with the same active element as the one with which the gamma rays interact. In particular, the neutrons lose almost all their kinetic energy following upon elastic or anelastic impacts mainly with the nuclei of the plastic scintillator (slowing-down or thermalization process). The neutrons are then captured by the nuclei of the absorber material with emission of a cascade of gamma rays, with a characteristic total energy of the absorber material used (for example, approximately 8 MeV in the case of gadolinium), which interact as described previously.

Since the total energy in terms of gamma radiation released by interaction of the neutron with the high-neutron-capture absorber material is in the region of 8 MeV, whereas the energy associated to the gamma rays emitted during spontaneous decay of the radionuclides is always lower than 8 MeV, the device according to the invention is able to detect simultaneously gamma rays and neutrons by discriminating the two types of particles, counting the gamma rays (in different energy intervals) and the neutrons impinging upon the detector.

The signal of a neutron is detected and discriminated from the signal of gamma rays by setting a threshold in the energy spectrum of gamma rays in the region of a few megaelectronvolts, since in a significant fraction of gamma events due to neutron capture the total energy deposited is higher than that of gamma sources. Consequently, the increase, with respect to the background value, of the rate of events with energy higher than this threshold is indicative of the presence of a neutron source.

To sum up, the device and the method according to the invention achieve the following advantages as compared to the solutions of the known art:

the active part of the device is made of materials that are readily available and present contained costs, and hence represents a valid alternative to the use of known detectors operating with $^3$He, in particular in the preferred sector of application of radiation portal monitors;

the device according to the invention is provided with a detector that is sensitive to gamma rays but is able to detect and discriminate gamma rays and neutrons, and is hence suited to performing both of the functions required of RPMs for which there is general demand;

the device according to the invention is provided with a detector that is able to detect all the neutrons irrespective of their energy (thermal energy, epithermal energy, and fast energy); and the detector according to the invention can be obtained also in modular form, and hence can be used for producing devices having different sizes and volumes so as to obtain the efficiency required in the specific application, without the need for substantial structural modifications.

BRIEF DESCRIPTION OF THE DRAWINGS

Further characteristics and advantages of the present invention will emerge clearly from the ensuing description of a non-limiting example of embodiment thereof, with reference to the annexed drawings, wherein:

FIG. 1 is a schematic view of a device for detecting neutrons and gamma rays according to the invention, in particular configured as a portal for constituting a so-called "radiation portal monitor";

FIG. 2 is a schematic view of a detector forming part of the device according to the invention;

FIGS. 3 to 5 are schematic views of respective details of the detector of FIG. 2; and FIG. 6 is a block diagram that shows the main steps of the method for detection and discrimination of neutrons and gamma rays emitted by radionuclides according to the invention.

BEST MODE FOR CARRYING OUT THE INVENTION

FIG. 1 is a schematic representation of a device 1 for detecting neutrons and gamma rays, comprising at least one detector 2 and an acquisition and data-analysis system 3, connected to the detector 2 for acquiring and processing signals received from the detector 2.

In the non-limiting example illustrated in FIG. 1, the device 1 is used in a portal configuration, to provide a so-called radiation portal monitor 4 for detecting radionuclides possibly carried by persons and/or vehicles moving along assigned paths and specifically through the portal 4.

The device 1 hence comprises a pair of facing detectors 2 connected to the acquisition and data-analysis system 3. The two detectors 2 are substantially the same and have the respective entry faces 5 facing one another (which in use face the object/source to be monitored).

Each detector 2 may be constituted by one or more modular functional units 6, which can be combined together (set alongside one another horizontally and/or set on top of one another vertically) to provide portals 4 of different size and/or capacity.

Described for simplicity in what follows is a detector 2 formed by a single functional unit 6.

With reference also to FIGS. 2-5, a detector 2 (i.e., a functional unit 6) extends substantially along a longitudinal axis A and comprises an active part 7 sensitive to gamma rays, which includes just one active material or else a number of active materials sensitive to gamma rays and uses only these active materials for detecting both gamma rays and neutrons.

In particular, the active part 7 is formed by a plurality of scintillator layers 8 sensitive to gamma rays and absorber layers 9 set on top of one another and alternating with one another, having in particular the shape substantially of a thin sheet or plate, all of which are set parallel to one another and to a longitudinal plane (vertical in use) and are coupled to one another on respective substantially plane faces. The scintillator layers 8 are separated from one another by absorber layers 9.

The scintillator layers 8 are plane layers made of a scintillator material sensitive to gamma rays, in particular an organic scintillator (also referred to as "plastic scintillator", i.e., made of polymeric material), for example, polyvinyltoluene.

The absorber layers 9 are plane solid layers that contain at least one neutron-absorbing material, containing, for example, metal elements having a large section of impact for neutron capture. The neutron-absorbing material is able, by interacting with the incident neutrons, to produce in turn gamma rays. In particular, the absorber layers 9 contain cadmium or gadolinium in a solid form, in particular in metal form or in the form of oxides, etc., possibly applied to a sheet substrate. For example, each absorber layer 9 is constituted by a sheet of polymeric material coated with gadolinium oxide, or containing gadolinium oxide in a resin-based matrix.

The detector 2 comprises at least two scintillator layers 8 and preferably, but not necessarily, comprises a total number of scintillator layers 8 of between 5 and 15.

The total amount of absorber material (gadolinium or cadmium, excluding the possible substrate material that forms, together with the absorber material, an absorber layer 9) set between two scintillator layers 8 is comprised between approximately 2 mg/cm$^2$ and approximately 2 g/cm$^2$, irrespective of the deposition technology (coating, in the form of sheets, etc.) and the chemical form (metal, oxide, carbide, etc.).

Indicatively, the scintillator layers 8 have transverse dimensions (width and length) of the order of tens of centimeters and a thickness of the order of the centimeter. For example, the scintillator layers 8 have thickness comprised between approximately 5 and approximately 100 mm and, preferably, between approximately 5 mm and approximately 50 mm, in particular around approximately 20 mm.

The absorber layers 9 have transverse dimensions similar to those of the scintillator layers 8 and a thickness such as not to induce significant energy losses by gamma rays with energies of the order of the megaelectronvolt, for example a thickness of some tens of microns.

In one embodiment, the scintillator layers 8 and the absorber layers 9 are arranged in elementary cells 10, each cell 10 being formed (FIG. 4) by a scintillator layer 8 and by an absorber layer 9 coupled along respective substantially plane faces.

The active part 7 of the detector 2 is hence formed by a plurality of cells 10 set on top of one another, indicatively around ten cells, each formed by a scintillator layer 8 and by an absorber layer 9.

It remains understood that the active part 7 may be formed with various arrangements of scintillator layers 8 and absorber layers 9.

In general, the active part 7 has a substantially prismatic shape, in particular the shape of a parallelepiped, which results from stacking of the scintillator layers 8 and of the absorber layers 9 (which have as a whole a rectangular shape in plan view), and extends along the axis A between two opposite longitudinal ends 11.

The active part 7 is provided with photomultipliers 13 (FIG. 2), located at the ends 11 for detecting (or "reading") emission by the active part 7 or by parts thereof and in particular for collecting part of the energy released by interaction of the gamma rays with the scintillator material, as will be clarified hereinafter. The photomultipliers 13 are equipped with respective casings and magnetic shields (which are known).

Optical coupling between the photomultipliers 13 and the active part 7 is provided by direct contact or else, as illustrated in FIG. 2, via light guides 14 that connect the photomultipliers 13 to the active part 7.

The detector 2 comprises a plurality of active sections 15A, 15B, each of which is formed by a plurality of plane scintillator layers 8 and absorber layers 9 set on top of one another and alternating with one another. Each active section 15A, 15B has two or more scintillator layers 8 alternating with absorber layers 9. In the example shown in FIG. 2, the detector 2 comprises a first active section 15A and a second active section 15B, which are set alongside one another and extend parallel to the axis A between the ends 11 and precisely between respective opposite longitudinal ends 11A, 11B of their own.

Each active section 15A, 15B is formed by a plurality of plane scintillator layers 8 and absorber layers 9 set on top of one another and alternating with one another. Each active section 15A, 15B has two or more scintillator layers 8 alternating with absorber layers 9.

The two active sections 15A, 15B are asymmetrical with respect to a longitudinal plane of the device, parallel to the axis A and to the scintillator layers 8 and the absorber layers 9; namely, the active sections 15A, 15B have a different thickness and/or a different number of scintillator layers 8 alternating with absorber layers 9 (i.e., of elementary cells 10).

The two active sections 15A, 15B are provided with respective photomultipliers 13A, 13B and are read independently of the respective photomultipliers 13A, 13B. In particular, each active section 15A, 15B is provided with a pair of photomultipliers 13A, 13B set at the longitudinal ends 11A, 11B of the respective active section 15A, 15B. Each active section 15A, 15B thus has two or more scintillator layers 8, alternating with absorber layers 9 and optically connected to a single pair of photomultipliers 13A, 13B, which are located at respective axially opposite longitudinal ends 11A, 11B of the active section 15A, 15B for collecting energy released by the interaction of the gamma rays with the scintillator material. Each pair of photomultipliers 13A, 13B is optically connected to a number of scintillator layers 8 alternating with absorber layers 9.

Each end 11A, 11B has a peripheral end edge 16, substantially rectangular, and is connected to the respective photomultiplier 13A, 13B by an appropriately shaped light guide 14. In particular, each light guide 14 extends parallel to the axis A between an entry 17, which is joined to an edge 16 of an end 11A, 11B and has the shape of the edge 16 to which it is joined (hence, substantially rectangular), and an exit 18, which is opposite to the entry 17 and is joined to a photomultiplier 13 and has substantially the shape of an entry section of the photomultiplier 13 (or of the corresponding casing) to which it is joined (for example, a substantially circular shape).

The photomultipliers 13 are provided with power-supply cables (not illustrated for simplicity) and transmission cables, which define a circuit 19 (schematically shown in FIG. 1) that transmits the signals generated by the photomultipliers 13 to the acquisition and data-analysis system 3.

Preferably, the photomultipliers operate with a voltage comprised between 500 and 3000 V.

The first active section 15A, which in use is provided with the entry face 5 and faces the source or the object to be monitored (namely, in the portal configuration of the device 1, it faces the inside of the portal 4), has a smaller number of scintillator layers 8 and absorber layers 9 than the second active section 15B, which faces in use the side opposite to the source or object to be monitored (namely, the outside of the portal 5).

The active section 15A hence also has a smaller thickness than the active section 15B and is provided with (i.e., is read by) photomultipliers 13A with a smaller diameter than the photomultipliers 13B associated to the active section 15B.

Each photomultiplier 13 has a generically cylindrical shape and a diameter comparable with the overall thickness of the active section 7 to which it is connected.

Preferably, each photomultiplier 13 has a cross section of area at least 5% greater than the cross section of the active section 15 to which it is associated.

In one embodiment provided purely by way of non-limiting example, the active section 15A is made up of two scintillator layers 8 and is read by 3-inch photomultipliers 13, while the second part is made up of ten scintillator layers 8 read by 5-inch photomultipliers. The active sections 15A, 15B may in any case have a different number of layers 8, 9.

Set between the scintillator layers 8 of both of the active sections 15A, 15B are the absorber layers 9.

Advantageously, the two active sections 15A, 15B are separated by a separation plate 20 (FIGS. 2 and 3), made, for example, of metal material, containing a greater amount of gadolinium than each of the absorber layers 9.

With this specific configuration (or other similar configurations), the detector 2 (and hence the device 1 as a whole) presents a greater sensitivity in regard to low-energy photons, thanks to the independent reading of the first scintillator layers 8 (i.e., those of the first active section 15A, which are relatively few, for example one to five), where precisely the low-energy photons are absorbed.

There moreover follows an increase in the efficiency of the detector 2 in detection of thermal neutrons, obtained with the addition of the plate 20 with greater content of gadolinium between the two active sections 15A, 15B in such a way as to provide an area with high concentration of gadolinium within the volume of scintillator material.

The active part 7 is advantageously contained within a casing 21, made, for example, of aluminium or plastic (illustrated, schematically, in FIG. 1), having both functions of mechanical support and functions of shielding from light.

Some indicative parameters of the detector 2 as a whole are listed, once again by way of non-limiting example, in what follows:
  overall volume of scintillator material: greater than 10 l
  width of the scintillator layers: 20-60 cm (preferably around 40 cm)
  height of the scintillator layers: 20-200 cm (preferably around 100 cm)
  thickness of the scintillator layer: 5-100 mm (preferably 5-50 mm, for example around 20 mm)
  number of scintillator layers: in relation to the thickness of the scintillator layers 8 themselves, selected in such a way that the overall thickness of the detector 2 is around 20 cm (preferably, twelve scintillator layers with a thickness of 20 mm)
  overall amount of gadolinium oxide (having a density of 7.41 g/cm$^3$) in the absorber layers 9: in general, this depends upon the overall thickness of the scintillator layers 8 set between which is the gadolinium oxide; in the case where the scintillator layers 8 have a thickness of 20 mm, the absorber layers 9 contain an overall amount of gadolinium oxide comprised between approximately 2 mg/cm$^2$ and approximately 2 g/cm$^2$ (the preferred value, at which saturation occurs, is approximately 20 mg/cm$^2$).

The acquisition and data-analysis system 3 comprises at least one acquisition and data-analysis electronic board 23, connected to the photomultipliers 13, and a control unit 24 (for example, a computer), connected to the board 23.

For simplicity, the system for electrical supply of the device 1 is not illustrated.

The circuit 19 connects the photomultipliers 13 to the data-acquisition board 23 and the latter to the control unit 24.

The board 23 operates as sampler/digitizer, preferably having a sampling rate not lower than 100 Msample/s. The board 23 is able to acquire, digitize, integrate in time, and save times and charges of analog signals of the duration of approximately 100 ns with rising edges of approximately 10 ns and a charge in the region of one picocoulomb, as well as to handle a high rate of events in pipeline, in the region of some hundreds of kilohertz per channel (non-processed data).

The board 23 is configured so as to: detect in pipeline mode a signal coming from the detector 2, and precisely the presence of pulses having a voltage higher than a programmable threshold; digitize the signal received; and calculate the area of the signal received (which is proportional to the energy deposited in the scintillator material of the detector 2) and the time of arrival of the signal.

The control unit 24 is provided with an acquisition and data analysis program, which implements an algorithm for discrimination between gamma events and neutron events and operates, in implementation of the method for detecting neutrons and gamma rays emitted by radionuclides according to the invention, following the scheme appearing in FIG. 6 and in particular so as to:

(a) initialize and manage the data-acquisition electronic chain (and hence, in particular, the acquisition and data-analysis board 23);

(b) process in real time the data acquired in order to determine the counting rates of gamma rays and neutrons; in particular, the raw data are processed by setting appropriate conditions of selection; as appears in FIG. 6, the selection conditions are represented by coincidence in time of signals and by energy cuts;

(c) calculate the rates of interaction of the neutrons and gamma rays, as regards the latter in various energy windows, integrating over times of the order of one tenth of a second;

(d) display graphically and save in real time the plot of the rates of gamma events and neutron events and the spectra of the energy deposited in the two cases;

(e) issue and store alarms in real time in the case of detection of gamma or neutron sources; in particular, the alarms are generated (and, for example, displayed and/or sent to purposely provided visual and/or acoustic warning apparatuses, also according to the current standards in force in the sector) in real time in the case where the rates of gamma events and/or neutron events exceed pre-set threshold values (that can be selected according to reference values defined by the measurement background level); and (f) save and display in real time the results of data analysis.

In greater detail, as shown in the block diagram of FIG. 6, the acquisition and data-analysis program includes the following steps:

initializing (101) the program;

initializing (102) the data-acquisition board 23;

starting (103) acquisition of data by the detector 2;

analysing (104) the data received and detecting (105) an event when the presence of a temporal coincidence of the signals of a pair of photomultipliers 13A, 13B occurs within a selectable time window of the order of tens of nanoseconds; this coincidence is an index of a real interaction of a particle in the detector 2 and has the function of suppressing the intrinsic noise of the photomultipliers 13;

once the presence of an event has been established (if the signals of the two photomultipliers 13A, 13B are correlated), discriminating (106) between gamma events and neutron events (via the discrimination algorithm), operating as follows:

analysing (107) the energy of the event: the integrals (area subtended by the pulse, proportional to the charge deposited) of the signals of the photomultipliers 13 recorded by the acquisition board 23 are processed in order to determine the total energy associated to the event itself;

if the energy thus determined is comprised in one of the gamma energy windows (108), incrementing (109) a gamma-event counter;

if the energy thus determined is higher than the threshold that defines the minimum energy of a neutron event (110), incrementing a neutron counter;

calculating (111) a rate of gamma events or neutron events by integrating the number of gamma events and neutron events over times of the order a tenth of a second; possibly, the rates are displayed (for example, in graphic form on a display) in real time for the user;

if one or more of the rates of gamma events and/or one or more of the rates of neutron events exceed respective threshold values (112) appropriately set on the basis of measurements of the environmental background level, generating (113) a corresponding alarm, for example shown on a display.

The rates of gamma events and neutron events and the possible alarms thus defined are recorded (114) for filing purposes.

In greater detail, the algorithm for discrimination between gamma events and neutron events operates as is described in what follows.

The signals of the photomultipliers 13 are acquired in pipeline mode by the board 23, which associates to each signal that exceeds the threshold value in voltage two values:

1) a value representing the instant in time in which the signal has occurred; and 2) a value representing the charge of the signal.

The acquisition and data-analysis program processes said values of the signals and defines as event the condition in which there occurs a coincidence in time, within a window of the order of tens of nanoseconds, between two signals of the photomultipliers set at the two ends of the scintillator layers.

To each event there is consequently associated:

an instant in time, equal to the average of the intants of the two signals; and a value of total charge (combination of the charges of the two signals), proportional to the total energy of the event released within the scintillator material.

Each event thus defined can be:

1. an event due to natural background radiation: cosmic rays or freely circulating materials containing slightly radioactive elements (for example: $^{40}$K present in concrete, $^{238}$U in the ground, etc.);

2. an event due to a gamma source; and 3. an event due to a neutron source.

Rejection of the component due to the measurement background is made during analysis of the data integrated over the entire measurement period, by subtracting the background energy spectrum from the total energy spectrum. For example, the background component (which is assumed as being stable in the limits of uncertainty of measurement) is measured at the moment of installation and/or activation of the device 1. Possibly, new periodic measurements of the background radiation may be carried out (for example, when the device 1 is not "busy" owing to passage of goods/persons to be screened) in order to update the measurement of the background radiation, and in this way the subtraction of the background component may be made "in real time", i.e., an instant after passage of the goods/person, immediately before supplying at output the energy spectrum.

Discrimination between a gamma event and a neutron event is made in real time by implementation of the discrimination algorithm in the acquisition and data-analysis program.

The program analyses, in real time, the total energies $E_{TOT}$ of the events.

As described previously, if the total energy of an event released within the scintillator layers 8 exceeds a limit value $E_{LIM}$ (of the order of a few megaelectronvolts) the event corresponds to a release of energy in the form of photons following upon neutron capture in the absorber layers 9.

Consequently, according to the energy of the event, the latter is classified as:

an event originating from a gamma source, if $E_{TOT} < E_{LIM}$;

an event originating from a neutron source, if $E_{TOT} \geq E_{LIM}$.

The total energy $E_{TOT}$ of the event is computed as sum of the energies $E_{FRONT}$, $E_{BACK}$ released within the scintillator layers 8 of the active sections 15A, 15B.

Advantageously, an event is classified as originating from a neutron source only in the presence of a non-zero signal in the rear active section 15B, set furthest away in use from the object/source to be monitored, i.e., if $E_{TOT} \geq E_{LIM}$ and $E_{BACK} > 0$.

In the case of events classified as originating from a gamma source, the program implements a further classification in some energy subintervals of amplitude of the order of hundreds of kiloelectronvolts, in such a way as to enable a basic identification of the source. For example, typical gamma sources such as $^{137}$Cs and $^{60}$Co emit photons at different energies ($^{137}$Cs: approximately 600 keV; $^{60}$Co: approximately 1.1 and approximately 1.3 MeV). Consequently, classifying the events in at least two distinct intervals containing these energy values makes it possible to identify the source and establish whether it is caesium or cobalt.

The number of events is then integrated, in each energy window, over a time of the order of tenths of a second; in this way, the program computes an estimation of the corresponding rates of events.

Threshold values on the rates of events are defined starting from the values of these rates in the absence of sources (i.e., in the presence of background radiation alone). In the case where one or more rates computed by the program exceed the threshold values, a corresponding alarm is issued.

Operation of the device 1 implementing the method for detecting neutrons and gamma rays emitted by radionuclides according to the invention is described in what follows.

When an object containing radionuclides passes in front of the detector 2, for example passing through the portal 5, the gamma rays emitted by the radionuclides due to spontaneous decay interact in the detector 2 mainly as a result of the Compton effect and of photoelectric absorption, releasing a significant fraction of their energy into the active part 7. From the spectrum of the signals of the photomultipliers 13 the spectrum of the incident gamma rays is determined, and, by applying appropriate cuts, the counting rates of the gamma rays in various energy windows are monitored. The increase of said counting rates with respect to the background level is indicative of the presence of a gamma radioactive source.

Also the neutrons emitted by the radionuclides interact with the active part 7 of the detector 2. In particular, the neutrons lose almost all their kinetic energy (slowing-down or thermalization process) following upon elastic or anelastic impact mainly with the nuclei of the scintillator material. The neutrons are then captured by the nuclei of the absorber material with emission of a cascade of gamma rays having a characteristic total energy (for example, of approximately 8 MeV if gadolinium is used as absorber material), which interact as described previously.

The signal of a neutron is detected and discriminated from the gamma-ray signal by setting of a threshold in the energy spectrum of gamma rays in the region of a few megaelectronvolts, since in a significant fraction of the gamma events due to neutron capture the total energy deposited is higher than that of gamma sources. Consequently, the increase, with respect to the background level, of the rate of the events with energy higher than this threshold is indicative of the presence of a neutron source.

Possibly, in case of events classified as originating from a gamma source, the program implements also the further classification in the energy subintervals for a basic identification of the source.

Finally, it is understood that further modifications and variations may be made to the device and the method described and illustrated herein, without thereby departing from the scope of protection of the annexed claims.

The invention claimed is:

1. A device (1) for detecting neutrons and gamma rays, coming from radionuclides carried by persons and/or vehicles moving along a pre-set path, comprising at least one detector (2) and an acquisition and data-analysis system (3) connected to the detector (2); wherein the detector (2) has just one active part (7) that extends along a longitudinal axis (A) and only includes one or more active materials sensitive to gamma rays, being formed by: a plurality of scintillator layers (8) sensitive to gamma rays, made of a scintillator material sensitive to gamma rays; and, set in between, absorber layers (9), containing at least one neutron-absorbing material; the scintillator layers (8) and the absorber layers (9) having substantially the shape of a thin sheet or plate and being coupled to one another on respective substantially plane faces; and wherein both the gamma rays and the neutrons are detected via the same scintillator layers (8) sensitive to the gamma rays and via the gamma emission generated by interaction of the neutrons with the absorber material of the absorber layers (9); the device (1) being characterized in that the detector (2) is organized in sections, the scintillator layers (8) and the absorber layers (9) being arranged in two or more active sections (15A, 15B) formed by respective groups of scintillator layers (8) alternating with absorber layers (9); each active section (15A, 15B) having two or more scintillator layers (8), which alternate with absorber layers (9) and are optically connected to a single pair of photomultipliers (13A, 13B), set at respective axially opposite longitudinal ends (11A, 11B) of the active section (15A, 15B) for collecting energy released by the interaction of the gamma rays with the scintillator material, each pair of photomultipliers (13A, 13B) being optically connected to a number of scintillator layers (8) alternating with absorber layers (9), and the active sections (15A, 15B) being read independently by the respective photomultipliers (13A, 13B), said active sections being asymmetrical with respect to a longitudinal plane, parallel to the axis (A), to the scintillator layers (8), and to the absorber layers (9) of the device; said active sections having a different thickness and/or a different number of scintillator layers (8) alternating with absorber layers (9).

2. The device according to claim 1, wherein the first active section (15A), which is set in the front part of the device (1) and faces in use an object/source to be monitored, has a thickness and/or a number of scintillator layers (8) alternating with absorber layers (9) smaller than the second active section (15B), which is set in the rear part of the device (1) and faces in use the side opposite to the object/source to be monitored.

3. The device according to claim 1, wherein the scintillator material is a polyvinyltoluene plastic scintillator; and the neutron absorbing material is cadmium or gadolinium.

4. The device according to claim 1, wherein each absorber layer (9) that separates two scintillator layers (8) contains a total amount of absorber material comprised between approximately 2 mg/cm$^2$ and approximately 2 g/cm$^2$.

5. The device according to claim 1, wherein the optical coupling between the photomultipliers (13) and the respective active sections (15A, 15B) is either obtained by direct contact or via light guides (14) that connect the photomultipliers (13) to the respective active sections (15A, 15B).

6. The device according to claim 1, wherein the photomultipliers (13) are connected to the respective active sections (15A, 15B) by respective light guides (14); each light guide (14) having an entry (17), joined to an edge (16) of an end (11) of the respective active section (15A, 15B) and having the shape of said edge (16), substantially rectangular; and an outlet (18), opposite to the entry (17) and joined to a photomultiplier (13) and basically having the shape of an entry section of the photomultiplier (13) to which it is joined.

7. The device according to claim 1, wherein the two active sections (15A, 15B) are separated by a plate (20) containing a greater amount of absorber material than each of the absorber layers (9).

8. The device according to claim 1, wherein the device (1) has a portal configuration and constitutes a portal (5) for monitoring the radiation for detecting radionuclides possibly carried by persons and/or vehicles moving through the portal (5); the device (1) comprising a pair of facing detectors (2) connected to the acquisition and data-analysis system (3).

9. The device according to claim 8, wherein each detector (2) is constituted by one or more modular functional units (6), that can be combined together and are set alongside one another horizontally and/or set on top of one another vertically, to constitute portals (5) of different size and/or capacity.

10. The device according to claim 1, wherein the acquisition and data-analysis system (3) is configured so as to: analyse the signals coming from the detector (2) and calculate the total energy released within the detector (2) following upon an interaction with gamma rays or neutrons; and discriminate between gamma rays and neutrons incident on the detector (2) according to whether the energy is higher or lower than a pre-set threshold.

11. The device according to claim 10, wherein the acquisition and data-analysis system (3) is configured so as to: calculate the total energy $E_{TOT}$ of an event released within the scintillator layers (8) and compare said total energy $E_{TOT}$ with a pre-set limit value $E_{LIM}$; and classify the event as:
an event originating from a gamma source, if $E_{TOT}<E_{LIM}$; and
an event originating from a neutron source, if $E_{TOT}\geq E_{LIM}$.

12. The device according to claim 11, wherein the acquisition and data-analysis system (3) is configured so as to: calculate the total energy $E_{TOT}$ of the event as sum of the energies $E_{FRONT}$, $E_{BACK}$ released within the scintillator layers (8) of the first active section (15A) and of the second active section (15B), respectively; and classify the event as originating from a neutron source only in the presence of a non-zero signal in the active section (15B) set furthest away in use from the object/source to be monitored, i.e., if $E_{TOT}\geq E_{LIM}$ and $E_{BACK}>0$.

13. The device according to claim 11, wherein the acquisition and data-analysis system (3) is configured so as to classify the event, in the case of events classified as originating from a gamma source, in energy sub-intervals for basic identification of the source.

14. A method for detecting neutrons and gamma rays emitted by radionuclides, comprising the steps of:
providing a device (1) for detecting neutrons and gamma rays according to claim 3;
analysing the signals coming from the detector (2) of the device (1) and calculating the total energy released within the detector (2) following upon an interaction with gamma rays or neutrons; and
discriminating between gamma rays and neutrons incident on the detector (2) according to whether said energy is higher or lower than a pre-set threshold.

15. The method according to claim 14, comprising the steps of: calculating the total energy $E_{TOT}$ of an event released within the scintillator layers (8) and comparing said total energy $E_{TOT}$ with a pre-set limit value $E_{LIM}$; and classifying the event as:
an event originating from a gamma source, if $E_{TOT}<E_{LIM}$; and
an event originating from a neutron source, if $E_{TOT}\geq E_{LIM}$.

16. The method according to claim 15, wherein: the total energy $E_{TOT}$ of the event is computed as sum of the energies $E_{FRONT}$, $E_{BACK}$ released within the scintillator layers (8) of the first active section (15A) and of the second active section (15B), respectively; and the event is classified as originating from a neutron source only in the presence of a non-zero signal in the active section (15B) set furthest away in use from the object/source to be monitored, i.e., if $E_{TOT}\geq E_{LIM}$ and $E_{BACK}>0$.

17. The method according to claim 15, comprising the steps of classifying the event, in the case of events classified as originating from a gamma source, in energy sub-intervals for basic identification of the source.

18. The device of claim 3 wherein said plastic scintillator is formed of polyvinyltoluene.

19. The method of claim 14 wherein said plastic scintillator of said device is formed of polyvinyltoluene.

* * * * *